(12) United States Patent
Feng et al.

(10) Patent No.: US 10,230,239 B2
(45) Date of Patent: Mar. 12, 2019

(54) HIERARCHICAL ROBUST MODEL PREDICTIVE VOLTAGE AND VAR CONTROL WITH COORDINATION AND OPTIMIZATION OF AUTONOMOUS DER VOLTAGE CONTROL

(71) Applicant: ABB Schweiz AG, Baden (CH)

(72) Inventors: Xiaoming Feng, Cary, NC (US); Ning Kang, Morrisville, NC (US)

(73) Assignee: ABB Schweiz AG, Baden (CH)

( * ) Notice: Subject to any disclaimer, the term of this patent is extended or adjusted under 35 U.S.C. 154(b) by 178 days.

(21) Appl. No.: 15/346,880

(22) Filed: Nov. 9, 2016

(65) Prior Publication Data

US 2017/0133849 A1    May 11, 2017

Related U.S. Application Data

(60) Provisional application No. 62/252,805, filed on Nov. 9, 2015.

(51) Int. Cl.
*H02J 3/16* (2006.01)
*H02J 3/18* (2006.01)
(Continued)

(52) U.S. Cl.
CPC .............. *H02J 3/16* (2013.01); *G05F 1/70* (2013.01); *G06G 7/635* (2013.01); *H02J 3/1821* (2013.01);
(Continued)

(58) Field of Classification Search
CPC ...... G01R 11/48; G01R 11/52; G05B 13/026; G05F 1/70; G06G 7/635; H02J 3/16;
(Continued)

(56) References Cited

U.S. PATENT DOCUMENTS 4,365,190 A   12/1982  Pasternack et al.
4,769,587 A    9/1988  Pettigrew
(Continued)

FOREIGN PATENT DOCUMENTS

EP   2863285   4/2015

OTHER PUBLICATIONS

J.J. Grainger and S. Civanlar, "Volt/Var Control on Distribution Systems with Lateral Branches Using Shunt Capacitors and Voltage Regulators—Part 1; The Overall Problem," IEEE Trans. Power Apparatus and Systems, vol. PAS-104, No. 11, pp. 3278-3283, Nov. 1985.
(Continued)

*Primary Examiner* — Levi Gannon
(74) *Attorney, Agent, or Firm* — Taft Steetinius & Hollister LLP; J. Bruce Schelkopf

(57) ABSTRACT

Apparatuses, method and systems featuring model predictive voltage and VAR controls with coordination with and optional optimization of autonomous reactive power control such as autonomous distributed energy resource and/or autonomous switched capacitor banks One embodiment includes an electronic control system structured to construct a linearized model of the power distribution system including a plurality of predetermined nodes, operate a model predictive controller to identify optimized control commands using an objective function defined over a plurality of future scenarios over a look ahead time horizon and a plurality of constraints, and transmit the identified control commands to control operation of at least the voltage regulators and the switched capacitor banks.

29 Claims, 4 Drawing Sheets

(51) Int. Cl.
*H02J 3/38* (2006.01)
*G05F 1/70* (2006.01)
*G06G 7/635* (2006.01)
*H02J 13/00* (2006.01)
*H02J 3/00* (2006.01)

(52) U.S. Cl.
CPC .......... *H02J 3/381* (2013.01); *H02J 13/0079* (2013.01); *H02J 2003/003* (2013.01); *H02J 2003/007* (2013.01); *Y02E 40/30* (2013.01); *Y02E 60/76* (2013.01); *Y04S 40/22* (2013.01)

(58) Field of Classification Search
CPC .... H02J 3/18; H02J 3/1821; H02J 3/38; H02J 3/381–3/383; H02J 3/386; H02J 3/387; H02J 13/0079; H02J 13/0086; H02J 2003/003; H02J 2003/007; Y02E 40/12; Y02E 40/30
See application file for complete search history.

(56) References Cited

U.S. PATENT DOCUMENTS

| | | | |
|---|---|---|---|
| 4,916,377 A | 4/1990 | Terada et al. | |
| 5,422,561 A | 6/1995 | Williams et al. | |
| 5,541,498 A | 7/1996 | Beckwith | |
| 5,645,512 A | 7/1997 | Yu | |
| 5,670,864 A | 9/1997 | Marx et al. | |
| 8,195,338 B2 | 6/2012 | Feng et al. | |
| 8,283,903 B2 | 10/2012 | Fang | |
| 8,588,993 B2 | 11/2013 | Fang et al. | |
| 2005/0125104 A1* | 6/2005 | Wilson | H02J 3/06 700/295 |
| 2008/0177678 A1* | 7/2008 | Di Martini | G01D 4/002 705/412 |
| 2008/0195255 A1 | 8/2008 | Lutze et al. | |
| 2012/0133209 A1* | 5/2012 | O'Brien | H02J 3/1828 307/72 |
| 2013/0096724 A1* | 4/2013 | Divan | G05B 13/02 700/286 |
| 2013/0134779 A1* | 5/2013 | Watanabe | G05F 1/70 307/24 |
| 2014/0070617 A1 | 3/2014 | Detmers | |
| 2014/0097807 A1* | 4/2014 | Alatrash | H05K 999/99 323/205 |
| 2014/0103888 A1* | 4/2014 | Divan | G05F 3/02 323/208 |
| 2014/0176090 A1* | 6/2014 | Harjeet | H02J 3/12 323/209 |
| 2014/0277813 A1* | 9/2014 | Powell | H02J 3/1821 700/298 |
| 2014/0330441 A1 | 11/2014 | De Castro | |
| 2015/0112496 A1 | 4/2015 | Fisher et al. | |
| 2015/0311718 A1* | 10/2015 | Divan | H02J 3/18 323/208 |
| 2016/0164291 A1* | 6/2016 | Rosendahl | H02J 3/14 700/295 |

OTHER PUBLICATIONS

S. Civanlar and J.J. Grainger, "Volt/Var Control on Distribution Systems with Lateral Branches Using Shunt Capacitors and Voltage Regulators—Part 2: The Solution Method," IEEE Trans. Power Apparatus and Systems, vol. PAS-104, No. 11, pp. 3284-3290, Nov. 1985.
R. Baldick and F.F. Wu, "Efficient Integer Optimization Algorithms for Optimal Coordination of Capacitors and Regulators," IEEE Trans. Power Systems, vol. 5, No. 3, pp. 805-812, Aug. 1990.
I. Roytelman, B.K. Wee and R.L. Lugtu, "Volt/Var Control Algorithm for Modern Distribution Management System," IEEE Trans. Power Systems, vol. 10, No. 3, pp. 1454-1460, Aug. 1995.
I. Roytelman, B.K. Wee, R.L. Lugtu, T.M. Kulas and T. Brossart, "Pilot Project to Estimate the Generalized Volt/Var Control Effectiveness," IEEE Trans. Power Systems, vol. 13, No. 3, pp. 864-869, Aug. 1998.
S.J. Cheng, O.P. Malik and G.S. Hope, "An Expert System for Voltage and Reactive Power Control of a Power System," IEEE Trans. Power Systems, vol. 3, No. 4, pp. 1449-1455, Nov. 1988.
Brett A. Robbins, Christoforos N. Hadjicostis, Alejandro D. Dominguez-García, "A Two-Stage Distributed Architecture for Voltage Control in Power Distribution Systems," IEEE Transactions on Power Systems, vol. 28. No. 2, May 2013.
I. Roytelman, B.K. Wee and R.L. Lugtu, "Volt/Var Control Algorithm for Modem Distribution Management System," IEEE Trans. Power Systems, vol. 10, No. 3, pp. 1454-1460, Aug. 1995.
I. Roytelman, B.K. Wee, R.L. Lugtu, T.M. Kulas and T. Brossart, "Pilot Project to Estimate the Generalized Volt/Var Control Effectiveness," IEEE Trans. Power Systems, vol. 13, No. 3, pp. 864-869, Aug. 1996.
PCT Search Report and Written Opinion; European Patent Office; PCT Patent Application No. PCT/US2016/061035 dated Feb. 2, 2017, 11 pages.

* cited by examiner

HIERARCHICAL ROBUST MODEL PREDICTIVE VOLTAGE AND VAR CONTROL WITH COORDINATION AND OPTIMIZATION OF AUTONOMOUS DER VOLTAGE CONTROL

BACKGROUND

The present application relates generally to Voltage/VAR control optimization for power distribution systems. Power distribution systems are increasingly encountering the presence of distributed energy resources (DER) such as residential photovoltaic (PV) systems. High levels of DER penetration in power distribution systems present new planning and operation challenges to the system operator. DER systems can cause appreciable net power injections on distribution system as well as transmission systems. The injection of power on distribution circuits cause voltage rises on the distribution circuits which can become very severe for high levels of net power injections and may exceed prescribed standards or operating limits. Additionally, power from DER systems is frequently intermittent, uncertain and can change rapidly. The level of power from DER systems can vary significantly in a short period of time, causing rapid voltage variations in the distribution system. Traditional voltage regulation techniques are inadequate to handle the rapid voltage variations due to DER system power output changes. Furthermore, in many instances significant information about the power distribution system is unknown to the control center that manages the power distribution system. A number of aspects of the distribution system circuit topology may not be fully characterized or known. This obstructs the use of techniques requiring detailed a power flow model and/or a power flow solutions of the power distribution system.

SUMMARY

Unique apparatuses, method and systems featuring model predictive voltage and VAR controls with coordination and optimization of autonomous reactive power elements such as autonomous distributed energy resource and/or autonomous switched capacitor banks are disclosed. One exemplary embodiment includes an electronic control system structured to construct a linearized model of the power distribution system including a plurality of predetermined nodes, operate a model predictive controller to make multiple predictions, each of the predictions including predicted voltages at the predetermined nodes resulting from predicted control commands for the voltage regulators, the capacitor banks and the distributed energy resources, determine optimal controls using mixed integer programming solvers or mixed integer quadratic programming solvers based on the predictive model that meet one or more voltage conditions implemented in the model predictive controller, and transmit the identified control commands to control operation of at least the voltage regulators and the switched capacitor banks, and optionally the parameters for the autonomous controls of DERs. Further embodiments, forms, objects, features, advantages, aspects, and benefits shall become apparent from the following description and drawings.

BRIEF DESCRIPTION OF THE DRAWINGS

For the purposes of clearly, concisely and exactly describing exemplary embodiments of the present disclosure, the manner and process of making and using the same, and to enable the practice, making and use of the same, reference will now be made to certain exemplary embodiments, including those illustrated in the figures, and specific language will be used to describe the same. It shall nevertheless be understood that no limitation of the scope of the present disclosure is thereby created, and that the present disclosure includes and protects such alterations, modifications, and further applications of the exemplary embodiments as would occur to one skilled in the art.

DETAILED DESCRIPTION OF ILLUSTRATIVE EMBODIMENTS

Figure 1:
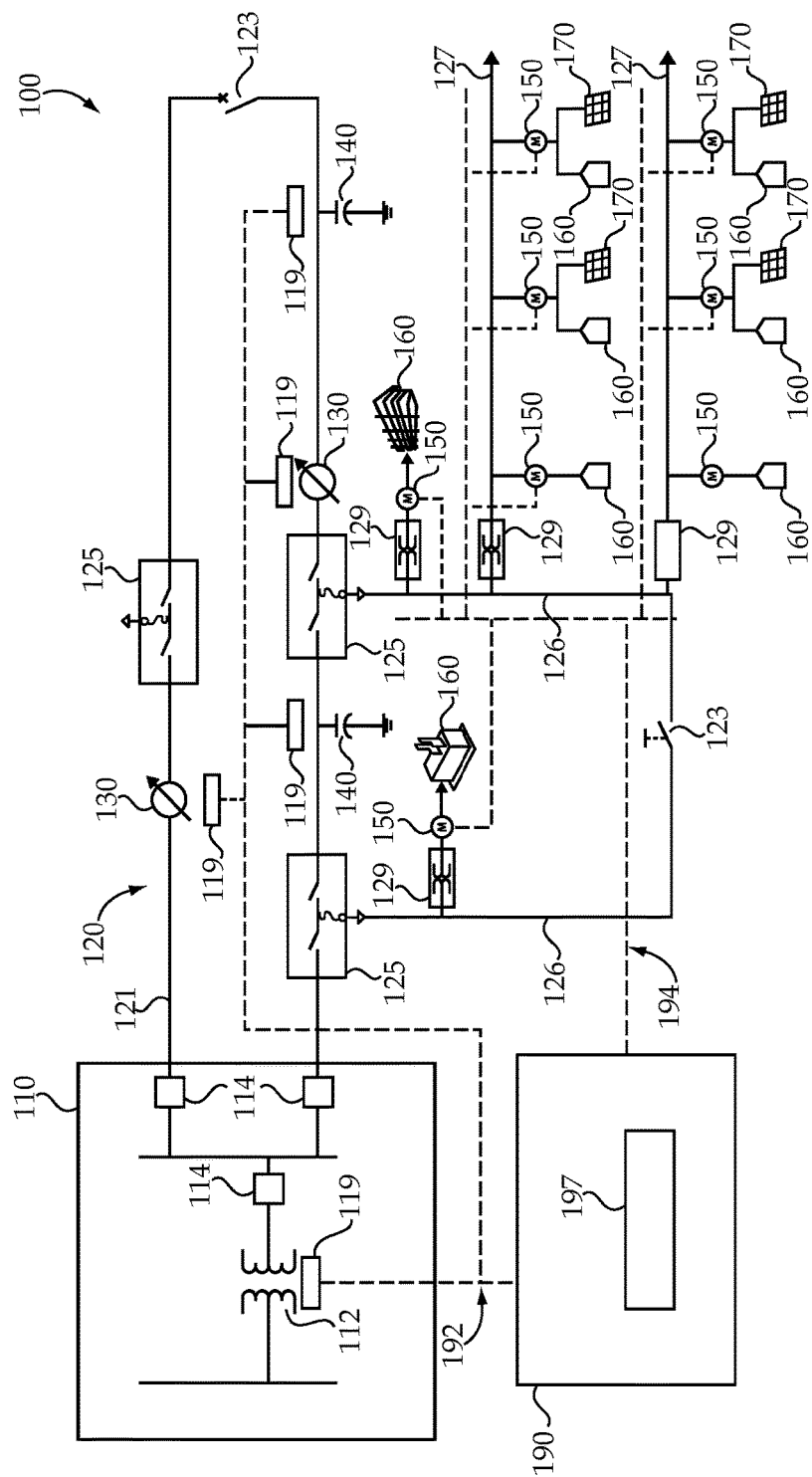
FIG. 1 is a schematic diagram illustrating an exemplary power distribution system.

With reference to FIG. 1 there is illustrated an exemplary power distribution system 100. System 100 includes substation 110 which is structured to convert power from a generation and/or transmission system (not illustrated). Substation 110 includes substation transformer 112 and circuit breakers 114 which are structured to distribute electrical power to power feeder line 121 of power feeder system 120. A controller 119 is operatively coupled with substation transformer 112 and is structured to control the substation transformer 112, for example, by changing a load tap position. System 120 includes tie switch 123 and switching cabinets 125 which are structured to selectably electrically connect and disconnect the system components with which they are connected. System 120 also includes voltage regulators 130 which are operatively coupled with respective controllers 119 that are structured to control the voltage regulation function of voltage regulators 130, for example, by changing tap position settings. In the illustrated embodiment system 120 comprises a plurality of voltage regulators 130. It shall be appreciated that further embodiments may comprise one or more voltage regulators 130. System 120 further includes switched capacitor banks 140 which are operatively coupled with respective controllers 119 that are structured to control on and off operation of switched capacitor banks 140 to inject reactive power into system 120. In the illustrated embodiment system 120 comprises a plurality of switched capacitor banks 140. It shall be appreciated that further embodiments may comprise one or more switched capacitor banks 140. In certain embodiments one or more of the switched capacitor banks 140 may be controlled by commands from a central converter. In certain embodiments one or more of the switched capacitor banks 140 may be autonomously controlled. In certain embodiments both centrally controlled and autonomous switched capacitor banks may be included.

System 120 includes various combinations of switching cabinets 125, lateral power lines 126, service transformers 129, and secondary power lines 127, and advanced metering infrastructure (AMI) meters 150 which are electrically coupled with respective loads 160. It shall be appreciated that AMI meters 150 are one example of an electronic power meter, and that electronic power meters may comprise any device that is configured to measure an electrical characteristic and communicate or transmit information of the measurement to other devices or systems. Loads 160 may take a variety of forms including industrial and commercial loads as well as residential loads. A number of loads 160 include distributed energy resources (DER) systems 170. It shall be appreciated that loads which include DER systems may function as both power loads and power sources and may be referred to as load/source systems. DER systems 170 include an inverter which may be a conventional inverter or a smart inverter. In the illustrated embodiment DER systems 170 are structured as photovoltaic arrays but may also include other types of DER systems such as those using small hydroelectric generators, biomass generators, biogas generators, wind power generators, fuel cells, and/or geothermal power systems.

Figure 7:
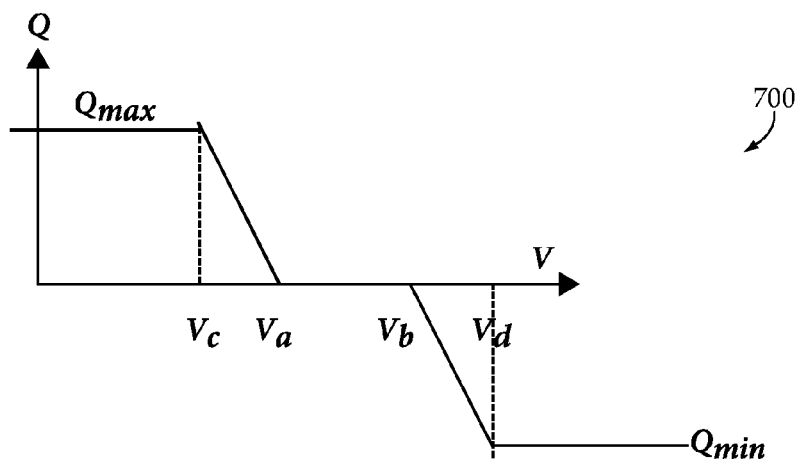
FIG. 7 is a graph illustrating an exemplary voltage/VAR droop curve of a smart inverter.

In the illustrated embodiment, system 100 is structured to include a high penetration of DER systems 170, i.e., a degree of penetration sufficient to cause appreciable power injection events and voltage variations impacting the operation of system 100. A number of the DER systems 170 include smart inverters which can provide voltage regulation and frequency regulation, among other regulation functions. For voltage regulation, smart inverters can operate in a number of different modes including a constant power factor mode and voltage/VAR droop curve control mode. In constant power factor control mode, the smart inverters control real and reactive power to provide operation at a selected power factor. In voltage/VAR droop control mode, the smart invert varies the reactive power output according to a deviation of measure voltage at a point of common coupling (PCC) from a defined voltage reference. An exemplary voltage/VAR droop control curve is illustrated in FIG. 7.

System 100 is in operative communication with control center 190 which includes a computer based electronic control system 197 that is in operative communication with controllers 119 via communication link 192 and is structured to send control commands to each of controllers 119 to control the operation of the respective devices with which they are in operative communication. In this manner control system 197 can provide commands to control the operation of substation transformer 112, voltage regulators 130 and switched capacitor banks 140. Control system 197 can also receive information from the controllers 119 regarding the state of these devices and systems. Control system 197 is also in operative communication with meters 150 via communication link 194 and is structured to receive information from meters 150 relating to the electrical conditions at particular locations in system 100 where each of meters 150 is located. Control system 197 is further structured to provide control command requests to smart meters 150 that are associated with DER systems 170.

It shall be appreciated that system 100 may include a number of additional instances of the components and systems described above including additional or alternate voltage regulators 130 and associated controllers 119, capacitor banks 140 and associated controllers 119, service transformers 129, lateral power lines 127, AMI meters 150, loads 160 and DER systems 170. Furthermore, these elements may be arranged in a variety of configurations varying from that illustrated in FIG. 1. In certain embodiments, system 100 may be structured as one or more microgrids.

The illustrated form of system 100 provides one non-limiting example of a power distribution system including a relatively high penetration of DER systems. In this type of distribution system, as loads 160 go through daily demand cycles, power flows on the system may result in power loss and voltage deviations from nominal voltage. Voltage and reactive power control devices such as voltage regulators, switched capacitor banks and reactive power of DER systems can be used as part of a voltage/VAR control system to regulate voltage and power losses.

Control system 197 is structured to provide Voltage/VAR controls for systems such as system 100 which include a high penetration of DER systems some of which may be equipped with smart inverter control capability. The Voltage/VAR controls implemented in control system 197 are preferably based on a hierarchical control architecture structured to coordinate the centralized optimization of voltage regulators and switched capacitor banks with faster acting local autonomous control of smart inverters. The controls utilize a model predictive controller to determine optimal setting of voltage regulators and switched capacitors over a look ahead time horizon which accounts for predicted future operation of DER systems 170 that the control system may have limited or no ability to control or influence. In certain forms, soft (i.e., non-mandatory) control commands for DER systems 170 may also be determined and transmitted to certain DER systems 170 which include smart inverters. Such soft control commands may include definite commands to change the operating mode, setting or parameters of a DER systems 170 are recognized as control system 197 as requests to the DER systems 170 rather than commands that can be imposed or mandated.

The controls implemented in system 197 preferably partition control responsibility into slower and faster time scales. In certain systems slower time scales may range from approximately half-hourly to several times per day and faster time scales may range from the order of several seconds to a few minutes, although variations on these general time scales are contemplated. Voltage regulators such as voltage regulators 130 and substation transformer 112 and switched capacitor banks such as capacitor banks 140 are preferably controlled over the slower time scale by a central control system such as system 197 in order to limit the number of control events to avoid premature wear on these components. Although these components are controlled over the slower time scale the preferred methods account not only for slow evolving load changes such as peak consumer power consumption periods but also utilize model predictions accounting for future DER conditions and their local autonomous control actions.

Smart inverters present in DER systems distributed in system 100 are structured to autonomously control faster evolving load and DER real power changes. The autonomous DER controls may be completely autonomous, i.e., entirely independent form a central control system such as system 197. The autonomous DER controls may also be autonomous as to their ultimate control decisions but utilize or selectively rely upon control commands communicated from a control system 197 such as power factors commands during operation in a constant power factor mode or preferred voltage set points and slope information during operation in a Voltage/VAR droop curve mode. The control commands may be specific settings for control parameters, for example, a command to generate 10 KVAR reactive power. The control commands may also be rule based control commands, for example a command to generate reactive power changes with the amount of real power generated so as maintain a certain power factor. It shall be appreciated that smart inverters are one example of controllers that may be operatively coupled with respective DERs and may control the operation thereof.

The controls implemented in system 197 are preferably structured to integrate the control effects of both slower time frame controls and faster time frame controls concurrently. The preferred controls model system operation including smart inverter operation in a centralized model predictive control that includes a robust optimization formulation to handled uncertainties in predictions about future DER operation. The optimization model may be actively updated online. A condition based two stage optimization process is preferably utilized for a failsafe solution to further optimize DER real power curtailment in order to correct any residual voltage violations. In certain forms the optimization may produce requested smart inverter voltage and VAR droop control curve settings for smart inverters.

Figure 2:
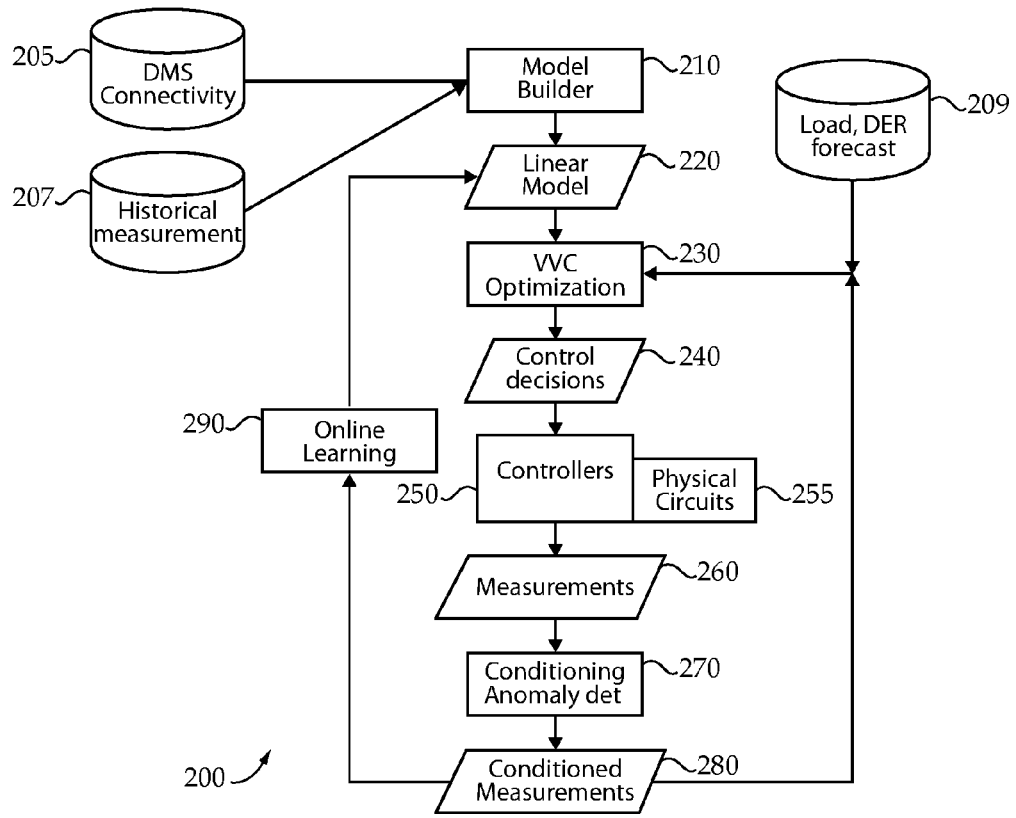
FIG. 2 is a schematic diagram illustrating exemplary controls for a power distribution system.

With reference to FIG. 2 there is illustrated a schematic diagram of exemplary voltage/VAR controls 200 which may be implemented in a non-transitory controller readable medium and may be executed by an electronic control system such as system 197. Controls 200 include a model builder 210 that is structured to construct a linearized circuit model of power distribution system 100 using circuit connection and impedance information from distribution management system 205, historical measurements of power distribution performance from performance observation system 207, and linear circuit principles.

Figure 3:
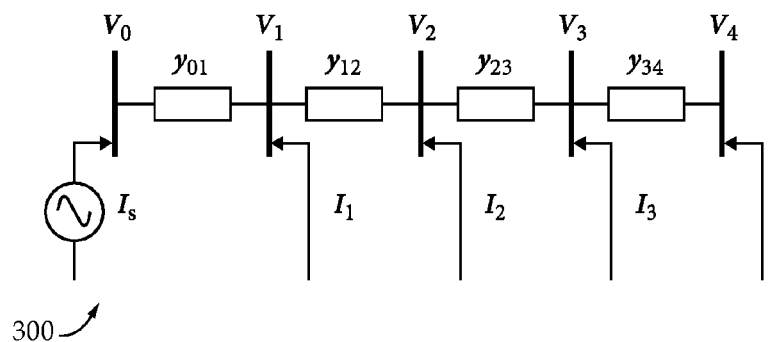
FIG. 3 is a circuit diagram illustrating a linearized circuit model.

With reference to FIG. 3, there is illustrated a circuit diagram according to an exemplary linearized circuit model that is constructed by model builder 210. The circuit model illustrated therein includes an AC substation current $I_S$, a substation reference bus voltage $V_0$, and voltages $V_1$, $V_2$, $V_3$, and $V_4$ at predetermined nodes which are preferably selected as representative points in system 100. The model also includes inter-node admittances $y_{01}$, $y_{12}$, $y_{23}$, and $y_{34}$, and injected currents $I_1$, $I_2$, $I_3$, and $I_4$ which may be provided by DER systems 170. The model can be implemented control system 197 including executable instructions stored in a non-transitory computer readable medium in accordance with the following equations.

The nodal current equation of the system in matrix form is:

$$YV = I$$

$$\begin{bmatrix} Y_{00} & Y_{0R} \\ Y_{R0} & Y_{RR} \end{bmatrix} \begin{bmatrix} V_0 \\ V_R \end{bmatrix} = \begin{bmatrix} I_S \\ I_R \end{bmatrix}$$

where $$Y = \begin{bmatrix} Y_{00} & Y_{0R} \\ Y_{R0} & Y_{RR} \end{bmatrix};$$

$$V = \begin{bmatrix} V_0 \\ V_R \end{bmatrix};$$

$$I = \begin{bmatrix} I_S \\ I_R \end{bmatrix};$$

$$V_R = [V_1 \; V_2 \; V_3 \; V_4]^T;$$

$$I_R = [I_1 \; I_2 \; I_3 \; I_4]^T$$

The nodal voltages of the non-boundary buses can be expressed as:

$$V_R = Y_{RR}^{-1} I_R - Y_{RR}^{-1} Y_{R0} V_0$$

When nodal current injection vector $I_R = 0$, $$V_R = V_0$$

$$V_R = V_0 + Y_{RR}^{-1} I_R$$

$$V_R = V_0 + ZI_R = V_0 + (R+jX)(I_R^d + jI_R^q)$$

The voltage change with respect to the source voltage can be approximated (in per unit value) by:

$$\Delta V_R = |V_R| - |V_0| \approx RI_R^d - XI_R^q = RP + XQ$$

where $\Delta V_R$ is a vector of voltage differences between a plurality of points (e.g., node voltages $V_1$, $V_2$, $V_3$, and $V_4$) and the source (reference) voltage (e.g., substation voltage $V_0$), $V_R$ is a vector of voltages at the plurality of points, $V_0$ is a vector of source voltages, R is a matrix of resistance components of inter-node impedances, $I_R^d$ is a vector of real nodal injection currents, $I_R q$ is a vector of reactive nodal injection currents, X is a matrix of the reactance component of inter-node impedances, and P, and Q are the nodal power injection vectors:

$$P = [P_1 P_2 P_3 P_4]^T$$

$$Q = [Q_1 Q_2 Q_3 Q_4]^T$$

With continuing reference to FIG. 2, the linearized circuit model 220 that is constructed by model builder 210 is utilized in a Voltage/VAR Control (VVC) optimization process 230. VVC optimization process 230 utilizes a model predictive controller to predict future conditions associated with future control commands for power distribution system 100. Forecasting system 209 provides forecast DER system conditions and forecast load conditions associated with the DER systems 170 and the loads 160 of system 100. The forecast information may be based upon information such as historical load data and weather information such as sunlight intensity which can influence photovoltaic based DER systems.

Figure 4:
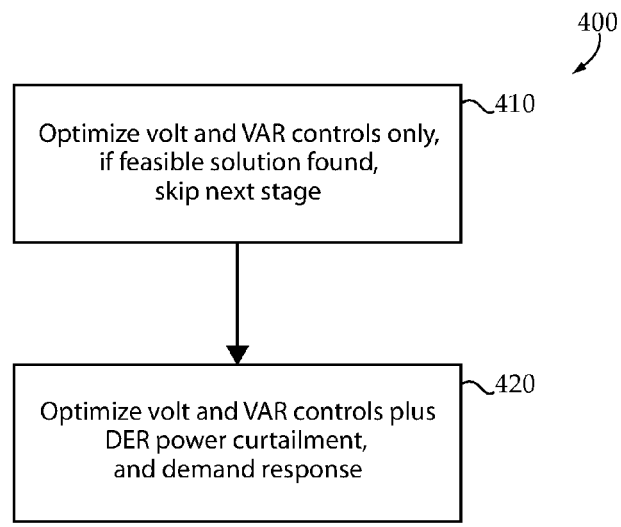
FIG. 4 is a schematic diagram illustrating an exemplary control hierarchy.

In describing the model predictive controller utilized by process 230 the following notations are used:
N—Nodal index set; $N = \{1, 2, \ldots, N\}$
T—Time interval index set; $T = \{1, 2, \ldots, T\}$
S—Scenario index set; $S = \{1, 2, \ldots, M\}$
u—Voltage and VAR controls (capacitor bank, voltage regulator, DER reactive power, DER power curtailment)
$u_{t,i}^{cap}$—capacitor control
$u_{t,i}^{tap}$—tap control
$u_{s,t,i}^{DERQ}$—DER reactive power control (injection is defined as positive)
$V_{t,i}^{ref}$—DER voltage and VAR control droop curve voltage reference
$D_f$—Diagonal matrix of DER voltage and VAR control droop coefficient
$u_{s,t,i}^{DERP}$—DER real power forecast
$u_{s,t,i}^{DERP\_C}$—DER real power curtailment
V—Nodal voltage phasor magnitude
β—weighing factor of DER power curtailment; default β=10~100
$V^{LB}$—Nodal voltage phasor magnitude lower bound
$V^{UB}$—Nodal voltage phasor magnitude upper bound
m—voltage control error margin
$V_{s,t,i}(0)$—Nodal voltage magnitude at the previous time interval.
S—Sensitivity of nodal voltage magnitude with respect to controls
$d_t$—Interval weighting factor
$w_s$—Scenario weighting factor
z—System maximum voltage With reference to FIG. 4 there is illustrated a schematic diagram of exemplary two stage controls 400 including first control stage 410 and second control stage 420. The model predictive controller utilized by optimization process 230 and control system 197 may be structured to implement controls 400. The model predictive controller first performs an optimization at control stage 410 to determine predicted future system states and control settings using a control objective and a control constraints for control stage 410. If an optimized set of control commands satisfying the constraints is determined at control stage 410, control system 197 can utilize this optimized set of commands to transmit control signals and it is not necessary to proceed to control stage 420. If such an optimized set of control commands is not determined, the model predictive controller performs an optimization at control stage 420 which includes control constraints in addition to those included in stage 410, such reduction of demand response and curtailment of DER real power. It shall be appreciated that the controls and control operations described herein can be implemented in one or more non-transitory computer readable media associated with one or more processors of control system 197 and may be structured in accordance with the exemplary embodiments described herein.

At control stage 410, the model predictive controller follows a control objective in which only reactive power control is utilized and no reduction of demand response or real power curtailment by the DER systems is utilized. The control commands or settings that can be optimized at control stage 410 include settings for tap changers, switched capacitors, and autonomously controlled reactive resources (e.g., smart inverter power factor settings, smart inverter voltage droop settings, and settings for autonomous switched capacitor banks).

At control stage 420, the model predictive controller follows a control objective under in which DER real power curtailment and reduction of demand response can also be utilized. Thus, the control commands or settings that can be optimized at control stage 420 include commands for DER real power curtailment and commands for load demand reduction in addition to commands for tap changers, switched capacitors, and parameters of autonomously controlled reactive resources (e.g., smart inverter power factor, smart inverter voltage droop control parameters, parameters for autonomous switched capacitor banks). Several exemplary implementations of two stage optimization controls 400 shall now be described in further detail.

Example 1

In example 1, at control stage 410 the control objective is voltage profile control objective which seeks to determine future control states (denoted "u") that minimize a weighted least square metric (or a linear version) of the voltage deviation from the nominal value over the look-ahead period and multiple operating scenarios. This objective can be implemented in accordance with the equation:

$$\min_{u} \sum_{s \in S}^{M} \sum_{t \in T}^{T} \sum_{i \in N}^{N} w_s d_t (V_{s,t,i} - V_{norm})^2$$

At control stage 410 the model predictive controller determines a matrix of predicted future voltages at the predetermined representative nodes which are treated as dependent variables by the model predictive controller. The model predictive controller also predicts matrices of future settings for voltage regulators 130, future settings for switched capacitor banks 140, utilizes future real power settings for DER systems 170, and predicts future reactive power output for DER systems 170 which are treated as independent variables. Because control system 197 has control over voltage regulators 130 and capacitor banks 140, the future settings for these devices may be treated as hard or mandatory control commands that may be determined and transmitted by system 197 to control operation of these devices. On the other hand, because control system 197 has no control or has no second-to-second information based on which to determine the best real time of reactive power output levels of DER systems 170, the central controller can only optimize the control rules for the smart inverter, for example, power factor, voltage and VAR droop parameters.

The predictions performed by the model predictive controller utilize a number of constraints on the control objective. One constraint is structured to describe the behavior of the system in terms of the nodal voltage magnitude at the previous time interval, the capacitor settings, the tap position settings and real and reactive power of the DER systems, and the system loads:

$$V_{s,t,i} = V_{s,t,i}(0) + \Sigma S_{i,j} u_{t,i}^{cap} + \Sigma S_{i,j} u_{t,i}^{tap} + + \Sigma S_{i,j} u_{s,t,i}^{DERQ} + \Sigma S_{i,j} u_{s,t,i}^{DERP}, (s,t,i) \in S \times T \times N$$

Another constraint is structured to provide boundaries on voltage conditions of the system. The model predictive controller may utilize matrix of upper voltage boundaries for the predicted future voltages, a margin of error for the upper boundaries, a matrix of lower voltage boundaries for the predicted future voltages, and a margin of error for the lower boundaries. These boundaries can be implemented in accordance with the equation:

$$V_{s,t,i}^{LB} + m \leq V_{s,t,i} \leq V_{s,t,i}^{UB} - m, (s,t,i) \in S \times T \times N$$

Another constraint is structured to account for predicted control actions of DER system 170. In one form the model predictive controller may be structured to determine DER system reactive power settings for smart inverters operating in voltage/VAR droop curve control mode which may also be used as controls in certain embodiments and may be determined in accordance with the following equation:

$$u_{s,t,i}^{DERQ} = D(V_{s,t,i} - V_{t,i}^{ref}), (s,t,i) \in S \times T \times N$$

It shall be appreciated that the voltage reference ($V_{t,i}^{ref}$) and the droop slope (D) can be optionally included as decision variables in the optimization.

Distributed energy resources equipped with smart inverters may control reactive power output in accordance with the voltage/VAR droop curve 700 illustrated in FIG. 7. Curve 700 can be expressed mathematically in accordance with the following equation:

$$Q = \frac{Q_{min}}{V_d - V_b}((V - V_b)U(V - V_b) - (V - V_d)U(V - V_d)) + \frac{Q_{max}}{V_a - V_c}((V_a - V)U(V_a - V) - (V_c - V)U(V_c - V))$$

Where U is a unit step function in accordance with the following equation:

$$U(x - a) = \begin{cases} 1, & x - a > 0 \\ 0, & x - a \leq 0 \end{cases}$$

It shall be further appreciated that, the voltages $V_a$, $V_b$, $V_c$, $V_d$ can optionally be included as decision variables in the optimization.

It shall be appreciated that the examples of voltage/VAR droop curve control herein are presented in an illustrative form. The controls may account for additional auxiliary continuous variables and integer (indicator) variables, and additional constraints to enforce non-convex control logic for both autonomous capacitor control and voltage/VAR droop curve control. In certain forms, the reactive power and unit step function techniques utilized in voltage/VAR droop curve control is utilized to account for the behavior of autonomously controlled switched capacitor banks. The behavior of autonomously controlled switched capacitor banks can be modeled using three control zones: an on zone, an off zone and a dead band which may be defined by the aforementioned unit step function and terms accounting for the discrete on/off nature of the switched capacitor banks.

In certain forms the model predictive controller may be alternately structured to determine DER power factor settings or mathematical variants thereof for smart inverters operating in constant power factor mode. In a preferred form the predicted DER reactive power output is expressed in terms of a product of the DER's real power output and a multiplier, from which the power factor can be uniquely derived.

Another constraint is structured to account for the ability of DER systems 170 to provide reactive power output. For example, the model predictive controller may utilize upper and lower boundaries on the ability of the DER systems 170 to inject reactive power into the system. These constraints can be implemented in accordance with the equation:

$$u_{s,t,i}^{DERQ,LB} \leq u_{s,t,i}^{DERQ} \leq u_{s,t,i}^{DERQ,UB}, (s,t,i) \in S \times T \times N$$

The model predictive controller may also utilize other operation constraints such as power factor constraints, device operation limits constraints, and energy storage time dependence constraints. These constraints may be implemented using upper and/or lower boundaries in a manner similar to the constraints described above.

As described above, the model predictive controller can transition its operation to control stage 420 to determine alternate predicted future system states and control settings using a control objective and control constraints associated with control stage 420. At control stage 420, the model predictive controller follows a voltage profile control objective under control conditions in which reactive power control is utilized along with real power curtailment and by the DER systems 170 and or load demand reduction of the load 160. For control stage 420, the objective for the model predictive controller is to determine future control settings that minimize the weighted least square metric of the voltage deviation from the nominal value in addition to a real power curtailment term for DER systems 170. This objective can be implemented in accordance with the equation:

$$\min_u \sum_{s \in S}^{M} \sum_{t \in T}^{T} \sum_{i \in N}^{N} w_s d_t (V_{s,t,i} - V_{norm})^2 + \sum_{s \in S}^{M} \sum_{t \in T}^{T} \sum_{i \in N}^{N} w_s d_t \beta u_{s,t,i}^{DERP\_C}$$

Control stage 420 includes constraints that are substantially similar to those described above in connection with control stage 410 as well as additional constraints accounting for real power curtailment. These constraints may be implemented in accordance with the following equation which is structured to account for the ability of DER systems 170 to curtail real power output based upon the real power being output by the DER systems 170 and a zero real power output:

$$0 \leq u_{s,t,i}^{DERP\_C} \leq u_{s,t,i}^{DERP}, (s,t,i) \in S \times T \times N$$

Other operation constraints may also be utilized (e.g. power factor constraints, device operation limits constraints, energy storage time dependence constraints).

Example 2

In example 2, the control objective for control stage 410 is a conservation voltage reduction control objective which seeks to determine future control states (denoted "u") that minimize the maximum system voltage (denoted z) over a plurality of potential states and times. This objective can be implemented in accordance with the equation:

$$\min_u \sum_{s \in S}^{M} \sum_{t \in T}^{T} w_s d_t z_{s,t}$$

Example 2 utilizes a constraint on the maximum system voltage relative to the actual voltage which can be implemented in accordance with the following equation:

$$z_{s,t} \geq V_{s,t,i}, (s,t,i) \in S \times T \times N$$

Example 2 also utilizes substantially similar constraints as described above in connection with example 1 which can be implemented in accordance with the following equations:

$$V_{s,t,i} = V_{s,t,i}(0) + \Sigma S_{i,j} u_{t,i}^{cap} + \Sigma S_{i,j} u_{t,i}^{tap} + + \Sigma S_{i,j} u_{s,t,i}^{DERQ} + \Sigma S_{i,j} u_{s,t,i}^{DERP}, (s,t,i) \in S \times T \times N$$

$$V_{s,t,i}^{LB} + m \leq V_{s,t,i} \leq V_{s,t,i}^{UB} - m, (s,t,i) \in S \times T \times N$$

$$u_{s,t,i}^{DERQ} = D(V_{s,t,i} - V_{t,i}^{ref}), (s,t,i) \in S \times T \times N$$

$$u_{s,t,i}^{DERQ,LB} \leq u_{s,t,i}^{DERQ} \leq u_{s,t,i}^{DERQ,UB}, (s,t,i) \in S \times T \times N$$

In example 2 if the model predictive controller transitions operation to stage 420, the model predictive controller uses a different control objective which allows for real power curtailment and/or load response reduction and which may be implemented in accordance with the following equation:

$$\min_u \sum_{s \in S}^{M} \sum_{t \in T}^{T} w_s d_t z_{s,t} + \sum_{s \in S}^{M} \sum_{t \in T}^{T} \sum_{i \in N}^{N} w_s d_t \beta u_{s,t,i}^{DERP\_C}$$

In example 2 at stage 420 the model predictive controller utilizes a number of constraints. The constraints utilized by the model predictive controller include constraints on the maximum system voltage which may be expressed in accordance with the following equation:

$$z_{s,t} \geq V_{s,t,i}, (s,t,i) \in S \times T \times N$$

The constraints utilized by the model predictive controller include constraints structured to describe the behavior of the system in terms of nodal voltage magnitude from the previous time interval, the capacitor settings, the tap position settings and real and reactive power of the DER systems, and the system loads which may be expressed in accordance with the following equation:

$$V_{s,t,i} = V_{s,t,i}(0) + \Sigma S_{i,j} u_{t,i}^{cap} + \Sigma S_{i,j} u_{t,i}^{tap} + + \Sigma S_{i,j} u_{s,t,i}^{DERQ} + \Sigma S_{i,j} (u_{s,t,i}^{DERP} - u_{s,t,i}^{DERP\_C}), (s,t,i) \in S \times T \times N$$

The constraints utilized by the model predictive controller include upper and lower limits on system voltages (including margins of error) which may be implemented in accordance with the following equation:

$$V_{s,t,i}^{LB} + m \le V_{s,t,j} \le V_{s,t,i}^{UB} - m, (s,t,i) \in S \times T \times N$$

The constraints utilized by the model predictive controller include constraints accounting for the reactive power controls commands of DER systems 170 which may be implemented in accordance with the following equation:

$$u_{s,t,i}^{DERQ} = D(V_{s,t,i} - V_{t,i}^{ref}), (s,t,i) \in S \times T \times N$$

The constraints utilized by the model predictive controller include constraints on the ability of DER systems 170 to provide reactive power output which may be implemented in accordance with the following equation:

$$u_{s,t,i}^{DERQ,LB} \le u_{s,t,i}^{DERQ} \le u_{s,t,i}^{DERQ,UB}, (s,t,i) \in S \times T \times N$$

The constraints utilized by the model predictive controller include constraints on the real power curtailment of DER systems 170 which may be implemented in accordance with the following equation:

$$0 \le u_{s,t,i}^{DERP\_C} \le u_{s,t,i}^{DERP}, (s,t,i) \in S \times T \times N$$

The model predictive controller implemented according to any of the foregoing examples preferably utilizes a temporal difference function expansion which makes use of nodal voltage measurements from a preceding time interval as the basis for prediction of nodal voltage measurements, for example, as expressed in the following equation:

$$V_i(t+1) = V_i(t) + \nabla f_i \begin{bmatrix} \Delta x \\ \Delta u \end{bmatrix}$$

Using a temporal difference technique the starting point for the predictions of the model predictive controller can be set using the most recent measurements rather than starting from an no load condition. This technique may be utilized to reduce the effect of non-linearities of the actual system on the accuracy of the linear predictive model.

Figure 5:
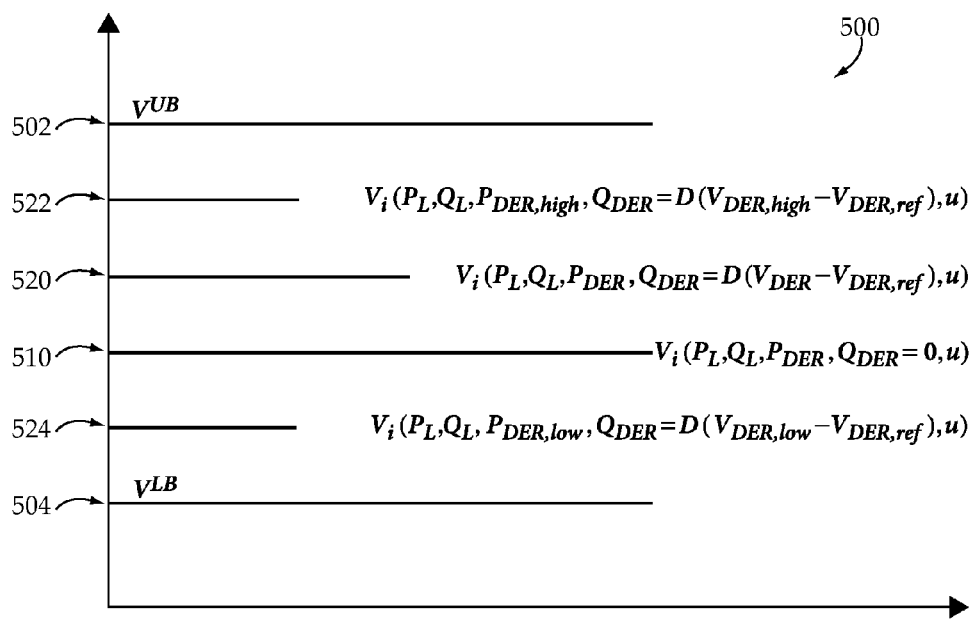
FIGS. 5 and 6 are graphs illustrating exemplary system state predictions and control concepts.

In any of the foregoing examples, the model predictive controller can determine predicted future voltages resulting from predicted future control settings and their relationship to the conditions imposed on the model predictive controller. FIG. 5 illustrates one example of such a determination which is performed at control stage 410. In FIG. 5, line 502 represents the upper voltage boundary and line 504 represents the upper voltage boundary that are implemented in the model predictive controller. Line 510 represents the voltage at the specified control setting when the reactive power outputs from DER systems 170 are zero. Line 520 represents a voltage prediction resulting from a set of future control settings, predicted real and reactive power of loads 160, predicted real and reactive power of DER systems 170 and predicted voltage of DER systems 170. Line 522 represents a voltage prediction for a set of future control settings, predicted real and reactive power of loads 160, predicted real and reactive power of DER systems 170 and voltage conditions of DER systems 170 that have been increased by a margin of error to be higher than actually predicted. Line 524 represents a voltage prediction for a set of future control settings, predicted real and reactive power of loads 160, predicted real and reactive power of DER systems 170 and voltage conditions of DER systems 170 that have been decreased by a margin of error to be lower than actually predicted. Because lines 520, 522 and 524 are all within the boundaries established by lines 502 and 504, control settings associated with line 520 may be verified by the model predictive controller provided to control system 197 to be transmitted as future control commands.

Figure 6:
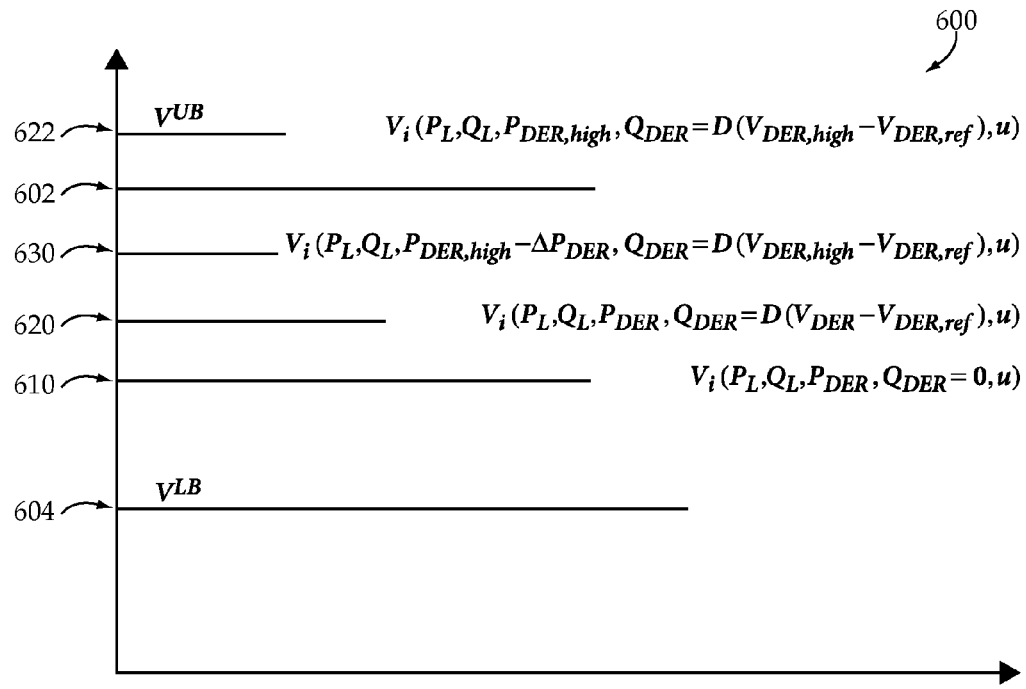

FIG. 6 illustrates another example of a determination of future control settings and their relationship to the conditions imposed on the model predictive controller which is performed at control stages 410 and 420. As illustrated therein, line 602 represents the upper voltage boundary implemented in the model predictive controller at control stage 410, and line 604 represents the upper voltage boundary implemented in the model predictive controller at control stage 410. Line 610 represents the voltage predictions when the reactive power outputs from DERS systems 170 are zero. Line 620 represents a voltage prediction at control stage 410 for a set of future control settings, predicted real and reactive power of loads 160, predicted real and reactive power of DER systems 170 and predicted voltage conditions of DER systems 170. Line 622 represents a voltage prediction at control stage 410 for a set of future control settings, predicted real and reactive power of loads 160, predicted real and reactive power of DER systems 170 and voltage conditions of DER systems 170 that have been increased by a margin of error to be higher than actually predicted. Because line 622 is outside the boundary established by line 602, control settings associated with line 620 will not be selected by the model predictive controller for utilization as future control commands. Based on this determination the model predictive controller can transition to operation level 420 to operate with a new control objective including real power reduction of the DER systems 170 as described above. Line 630 represents a voltage prediction at control stage 420 in which real power of DER systems 170 has been decreased. The decrease in DER real power is of an magnitude effective to bring the voltage conditions of DER systems 170 that are increased by a margin of error to be higher than actually predicted within the boundary established by line 602. Accordingly, control settings associated with line 630 may be verified by the model predictive controller provided to control system 197 to be transmitted as future control commands.

With continuing reference to FIG. 2, the results determined by VVC optimization process 230 are utilized to determining control commands for controllable devices of system 100 including substation transformer 120, voltage regulators 130, capacitor banks 140 and, in certain forms, for those units of DER systems 170 which are equipped with a smart inverter. These control commands may include tap position settings for the substation transformer 112 and voltage regulators 130, switching commands for switched capacitor banks 140, and power factor setting requests for DER systems 170 which include smart inverters structured to operate in a constant power factor mode or voltage references and/or slopes for DER systems 170 including smart inverters structured to utilize voltage/VAR droop curve control. As illustrated collectively by block 250 and block 255, once the control commands are determined electronic controller 197 can transmit these commands to controllers operatively coupled with physical circuits, for example, controllers 119 of system 100 associated with the aforementioned controllable devices.

After the control commands have been received and executed, the electronic control system 197 may perform measurements 260 of voltage and power conditions at the nodes which have been selected as representative points in system. The raw measurements are processed by conditioning and anomaly detection 270 and conditioned measurement data 280 is utilized for online learning operation 290 as well as updated historical operation which may be stored in system 209 and/or utilized in future operation of VVC optimization 230. Online learning operation 290 is structured to update the coefficients on linear model 220 based on evaluation of the current coefficients relative to conditioned measurement information 280. In this manner controls 200 may provide online learning and optimization of the model which may be repeated to include multiple VVC optimizations and learning events.

Further aspects of exemplary embodiments shall now be described. One embodiment is an electrical power distribution system comprising: a plurality of power lines electrically coupled with a distribution substation; one or both of one or more switched capacitor banks electrically coupled with the power lines and one or more voltage regulators electrically coupled with the power lines; a plurality of load/source systems electrically coupled with the power lines, the load/source systems including electronic power meters electrically coupled with the power lines and distributed energy resources electrically coupled with the electronic power meters, the distributed energy resources being equipped with respective controllers capable of providing autonomous voltage and VAR control of the distributed energy resources; and an electronic control system in operative communication with the one or both of the one or more switched capacitor banks and the one or more voltage regulators, the electronic power meters and the controllers of the distributed energy resources. The electronic control system is structured to perform the acts of: operating a model predictive controller to identify a set of optimized control commands using a control objective and a plurality of constraints, the plurality of constraints including a first constraint defining a linearized relationship between an electrical condition of the power distribution system and predicted control commands, a second constraint establishing one or more limits on the electrical condition, and a third constraint accounting for predicted autonomous operation of the distributed energy resources based upon a control mode of the respective controllers, and transmitting the identified optimized control commands to control operation of the one or both of the voltage regulators and the switched capacitor banks.

In certain forms of the electrical power distribution system, the act of operating includes operating at a first optimization stage structured with a first optimization objective for the model predictive controller, and operating at a second optimization stage structured with a second optimization objective for the model predictive controller that is different from the first optimization objective. In certain forms the first optimization objective excludes curtailment of real power of the distributed energy resources and utilization of demand response of the load/source systems and the second optimization objective includes one or both of curtailment of real power of the distributed energy resources and utilization of demand response of the load/source systems. In certain forms the act of operating includes constructing a linearized model of the power distribution system including a plurality of predetermined nodes, the plurality of predetermined nodes comprising a partial subset of the nodes of the power distribution system that are selected as representative nodes of the power distribution system. In certain forms the identified optimized control commands include commands for the respective controllers of the distributed energy resources and the act of transmitting includes transmitting the identified control commands to the respective controllers of the distributed energy resources. In certain forms the commands for the respective controllers of the distributed energy resources comprise a power factor command or a mathematically equivalent expression from which a power factor command can be determined. In certain forms the commands for the respective controllers of the distributed energy resources comprise a voltage setpoint for a voltage/VAR droop curve and a slope for the voltage/VAR droop curve, or a mathematically equivalent expression form which the voltage/VAR droop curve can be determined. In certain forms the identified control commands include control configuration parameters for autonomously controlled capacitor banks and the act of transmitting includes transmitting the identified control configuration parameters to the autonomously controlled capacitor banks. In certain forms the first constraint defines a relationship between voltages of the power distribution system at a plurality of nodes and demand of the load/source systems, and control commands for the voltage regulators, the switched capacitor banks and the respective controllers of the distributed energy resources. In certain forms the second constraint includes a voltage upper boundary and a voltage lower boundary. In certain forms the third constraint includes predicted reactive power of distributed energy resources with respective controllers operating in a voltage/VAR droop curve control mode. In certain forms the third constraint includes predicted reactive power of distributed energy resources with respective controllers operating in a constant power factor mode. In certain forms the electronic control system lacks information regarding the power distribution system that is required to run a power flow or solve a circuit model to obtain comprehensive information about the electrical state of the power distribution system. In certain forms the electronic control system does not require a real time power flow model or solution of the power distribution system to predict the electrical state of the power distribution system. In certain forms the control objective comprises one of a function structured to minimize deviation of a voltage of the power distribution system from a predetermined voltage and a function structured to minimize a maximum voltage of the power distribution system. In certain forms the electrical condition of the power distribution system includes a voltage condition of the power distribution system. In certain forms the model predictive controller is structured to one of utilize measurements from a preceding time interval as a basis for prediction and utilize moving base values for prediction of the electrical states of the distribution system effective to reduce the prediction errors in the optimization. In certain forms the model predictive controller is structured model a plurality of operating scenarios for the power distribution system. In certain forms the electronic control system is structured to perform the act of constructing a linearized model of the power distribution system including a plurality of predetermined nodes before the act of operating and to perform the following acts after the act of transmitting: receiving measurement information from the power distribution system associated with the plurality of nodes, receiving measurement information from the power distribution system associated with a plurality of branches of the power distribution system, updating coefficients of the linearized model using the measurement information, determining optimized control commands for at least one of voltage and VAR, real power curtailment and demand response, and repeating the operating, identifying, transmitting, receiving and updating acts. In certain forms, the linearized relationship between the electrical condition of the power distribution system and the predicted control commands includes a term accounting for measured values at a preceding time interval.

One exemplary embodiment is a method comprising: establishing operative communication between an electronic control system and an electrical power distribution system, the electrical power distribution system comprising a plurality of power lines electrically coupled with a distribution substation, one or both of one or more switched capacitor banks electrically coupled with the power lines and one or more voltage regulators electrically coupled with the power lines, a plurality of load/source systems electrically coupled with the power lines, the load/source systems including electronic power meters electrically coupled with the power lines and distributed energy resources electrically coupled with the electronic power meters, the distributed energy resources being operatively coupled with respective controllers capable of providing autonomous voltage and VAR control of the distributed energy resources, and an electronic control system in operative communication with the one or more switched capacitor banks, the one or more voltage regulators, the electronic power meters and the distributed energy resources; controlling the electronic control system to operate a model predictive controller to identify a set of optimized control commands using a control objective and a plurality of constraints, the plurality of constraints including a first constraint defining a linearized relationship between an electrical condition of the power distribution system and predicted control commands, a second constraint establishing one or more limits on the electrical condition, and a third constraint accounting for predicted autonomous operation of the distributed energy resources, and transmitting from the electronic control system the identified optimized control commands to control operation of one or both of the voltage regulators and the switched capacitor banks.

In certain forms the act of controlling the electronic control system to operate a model predictive controller comprises: operating the model predictive controller in a first mode using a first control objective, the first control objective excluding reduction of real power of the distributed energy resources and reduction of demand response of the load/source systems; and operating the model predictive controller in a second mode using a second control objective including one or both of reduction of real power of the distributed energy resources and includes reduction of demand response of the load/source systems. In certain forms the control objective comprises a function structured to minimize a maximum voltage of the power distribution system. In certain forms, during the act of controlling the electronic control system to operate the model predictive controller, the electronic control system does not have information regarding the power distribution system that is required to run a power flow or solve a circuit model to obtain comprehensive information about the electrical state of the power distribution system. Certain forms include before the act of controlling the electronic control system to operate the model predictive controller, operating the electronic control system to construct a linearized model of the power distribution system including a plurality of predetermined nodes; and after the act of transmitting, operating the electronic control system to receive measurement information from the power distribution system associated with the plurality of nodes, update coefficients of the linearized model using the measurement information, and repeat the operating, identifying, transmitting, receiving and updating acts.

One exemplary embodiment is an electronic control system adapted to operatively communicate with and control an electrical power distribution system including a plurality of power lines electrically coupled with a distribution substation, one or both of one or more switched capacitor banks electrically coupled with the power lines and one or more voltage regulators electrically coupled with the power lines, a plurality of load/source systems electrically coupled with the power lines, the load/source systems including electronic power meters electrically coupled with the power lines and distributed energy resources electrically coupled with the electronic power meters, the distributed energy resources being operatively coupled with respective controllers capable of providing autonomous voltage and VAR control of the distributed energy resources, the electronic control system comprising: a model predictive controller structured to determine and store in a non-transitory computer readable medium a set of optimized control commands using a control objective and a plurality of constraints, the plurality of constraints including a first constraint defining a linearized relationship between an electrical condition of the power distribution system and predicted control commands, a second constraint establishing one or more limits on the electrical condition, and a third constraint accounting for predicted operation of the distributed energy resources, and a transmitter structured to transmit one or more commands of the set of optimized control commands to control operation of one or both of the voltage regulators and the switched capacitor banks.

In certain forms the model predictive is controllable to operate in a first mode and a second mode, the first mode using a first control objective that prevents reduction of real power of the distributed energy resources and prevents reduction of demand response of the load/source systems, the a second mode using a second control objective that allows one or both of reduction of real power of the distributed energy resources and reduction of demand response of the load/source systems. In certain forms the control objective comprises a function structured to minimize deviation of a voltage of the power distribution system from a predetermined voltage. In certain forms the electronic control system does not have information regarding the power distribution system that is required to run a power flow or solve a circuit model to obtain comprehensive information about the electrical state of the power distribution system.

While exemplary embodiments have been illustrated and described in detail in the drawings and foregoing description, the same is to be considered as illustrative and not restrictive in character, it being understood that only certain exemplary embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

The invention claimed is:
1. An electrical power distribution system comprising:
a plurality of power lines electrically coupled with a distribution substation;
one or both of one or more switched capacitor banks electrically coupled with the power lines and one or more voltage regulators electrically coupled with the power lines;

a plurality of load/source systems electrically coupled with the power lines, the load/source systems including electronic power meters electrically coupled with the power lines and distributed energy resources electrically coupled with the electronic power meters, the distributed energy resources being equipped with respective controllers capable of providing autonomous voltage and volt-ampere reactive (VAR) control of the distributed energy resources; and an electronic control system in operative communication with the one or both of the one or more switched capacitor banks and the one or more voltage regulators, the electronic power meters and the respective controllers of the distributed energy resources;

wherein the electronic control system is structured to perform the acts of:

operating a model predictive controller to identify a set of optimized control commands using a control objective and a plurality of constraints, the plurality of constraints including a first constraint defining a linearized relationship between an electrical condition of the power distribution system and predicted control commands, a second constraint establishing one or more limits on the electrical condition, and a third constraint accounting for predicted autonomous operation of the distributed energy resources based upon a control mode of the respective controllers, and transmitting the identified optimized control commands to control operation of the one or both of the voltage regulators and the switched capacitor banks;

wherein the electronic control system does not require a real time power flow model or solution of the power distribution system to predict the electrical state of the power distribution system.

2. The electrical power distribution system of claim 1 wherein the act of operating includes operating at a first optimization stage structured with a first optimization objective for the model predictive controller, and operating at a second optimization stage structured with a second optimization objective for the model predictive controller that is different from the first optimization objective.

3. The electrical power distribution system of claim 2 wherein the first optimization objective excludes curtailment of real power of the distributed energy resources and utilization of demand response of the load/source systems and the second optimization objective includes one or both of curtailment of real power of the distributed energy resources and utilization of demand response of the load/source systems.

4. The electrical power distribution system of claim 1 wherein the act of operating includes constructing a linearized model of the power distribution system including a plurality of predetermined nodes, the plurality of predetermined nodes comprising a partial subset of the nodes of the power distribution system that are selected as representative nodes of the power distribution system.

5. The electrical power distribution system of claim 1 wherein the identified optimized control commands include commands for the respective controllers of the distributed energy resources and the act of transmitting includes transmitting the identified control commands to the respective controllers of the distributed energy resources.

6. The electrical power distribution system of claim 5 wherein the commands for the respective controllers of the distributed energy resources comprise a power factor command or a mathematically equivalent expression from which a power factor command can be determined.

7. The electrical power distribution system of claim 5 wherein the commands for the respective controllers of the distributed energy resources comprise a voltage setpoint for a voltage/VAR droop curve and a slope for the voltage/VAR droop curve, or a mathematically equivalent expression form which the voltage/VAR droop curve can be determined.

8. The electrical power distribution system of claim 1 wherein the identified control commands include control configuration parameters for autonomously controlled capacitor banks and the act of transmitting includes transmitting the identified control configuration parameters to the autonomously controlled capacitor banks.

9. The electrical power distribution system of claim 1 wherein the first constraint defines a relationship between voltages of the power distribution system at a plurality of nodes and demand of the load/source systems, and control commands for the voltage regulators, the switched capacitor banks and the respective controllers of the distributed energy resources.

10. The electrical power distribution system of claim 1 wherein the second constraint includes a voltage upper boundary and a voltage lower boundary.

11. The electrical power distribution system of claim 1 wherein the third constraint includes predicted reactive power of distributed energy resources with respective controllers operating in a voltage/VAR droop curve control mode.

12. The electrical power distribution system of claim 1 wherein the electronic control system lacks information regarding the power distribution system that is required to run a power flow or solve a circuit model to obtain comprehensive information about the electrical state of the power distribution system.

13. The electrical power distribution system of claim 1 wherein the control objective comprises one of a function structured to minimize deviation of a voltage of the power distribution system from a predetermined voltage and a function structured to minimize a maximum voltage of the power distribution system.

14. The electrical power distribution system of claim 1 wherein the electrical condition of the power distribution system includes a voltage condition of the power distribution system.

15. The electrical power distribution system of claim 1 wherein the model predictive controller is structured to one of utilize measurements from a preceding time interval as a basis for prediction and utilize moving base values for prediction of the electrical states of the distribution system effective to reduce the prediction errors in the optimization.

16. The electrical power distribution system of claim 1 wherein the model predictive controller is structured model a plurality of operating scenarios for the power distribution system.

17. The electrical power distribution system of claim 1 wherein the electronic control system is structured to perform the act of constructing a linearized model of the power distribution system including a plurality of predetermined nodes before the act of operating and to perform the following acts after the act of transmitting:

receiving measurement information from the power distribution system associated with the plurality of nodes, receiving measurement information from the power distribution system associated with a plurality of branches of the power distribution system, updating coefficients of the linearized model using the measurement information, determining optimized control commands for at least one of voltage and VAR, real power curtailment and demand response, and repeating the operating, identifying, transmitting, receiving and updating acts.

18. The electrical power distribution system of claim 1 wherein the linearized relationship between the electrical condition of the power distribution system and the predicted control commands includes a term accounting for measured values at a preceding time interval.

19. The electrical power distribution system of claim 1 wherein the third constraint includes predicted reactive power of distributed energy resources with respective controllers operating in a constant power factor mode.

20. An electrical power distribution system comprising:
a plurality of power lines electrically coupled with a distribution substation;
one or both of one or more switched capacitor banks electrically coupled with the power lines and one or more voltage regulators electrically coupled with the power lines;
a plurality of load/source systems electrically coupled with the power lines, the load/source systems including electronic power meters electrically coupled with the power lines and distributed energy resources electrically coupled with the electronic power meters, the distributed energy resources being equipped with respective controllers capable of providing autonomous voltage and volt-ampere reactive (VAR) control of the distributed energy resources; and
an electronic control system in operative communication with the one or both of the one or more switched capacitor banks and the one or more voltage regulators, the electronic power meters and the respective controllers of the distributed energy resources;
wherein the electronic control system is structured to perform the acts of:
operating a model predictive controller to identify a set of optimized control commands using a control objective and a plurality of constraints, the plurality of constraints including a first constraint defining a linearized relationship between an electrical condition of the power distribution system and predicted control commands, a second constraint establishing one or more limits on the electrical condition, and a third constraint accounting for predicted autonomous operation of the distributed energy resources based upon a control mode of the respective controllers, and
transmitting the identified optimized control commands to control operation of the one or both of the voltage regulators and the switched capacitor banks;
wherein the third constraint includes predicted reactive power of distributed energy resources with respective controllers operating in a constant power factor mode.

21. The electrical power distribution system of claim 20 wherein the electronic control system does not require a real time power flow model or solution of the power distribution system to predict the electrical state of the power distribution system.

22. A method comprising:
establishing operative communication between an electronic control system and an electrical power distribution system, the electrical power distribution system comprising a plurality of power lines electrically coupled with a distribution substation, one or both of one or more switched capacitor banks electrically coupled with the power lines and one or more voltage regulators electrically coupled with the power lines, a plurality of load/source systems electrically coupled with the power lines, the load/source systems including electronic power meters electrically coupled with the power lines and distributed energy resources electrically coupled with the electronic power meters, the distributed energy resources being operatively coupled with respective controllers capable of providing autonomous voltage and volt-ampere reactive (VAR) control of the distributed energy resources, and an electronic control system in operative communication with the one or more switched capacitor banks, the one or more voltage regulators, the electronic power meters and the distributed energy resources;
controlling the electronic control system to operate a model predictive controller to identify a set of optimized control commands using a control objective and a plurality of constraints, the plurality of constraints including a first constraint defining a linearized relationship between an electrical condition of the power distribution system and predicted control commands, a second constraint establishing one or more limits on the electrical condition, and a third constraint accounting for predicted autonomous operation of the distributed energy resources, and
transmitting from the electronic control system the identified optimized control commands to control operation of one or both of the voltage regulators and the switched capacitor banks;
wherein, during the act of controlling the electronic control system to operate the model predictive controller, the electronic control system does not have information regarding the power distribution system that is required to run a power flow or solve a circuit model to obtain comprehensive information about the electrical state of the power distribution system.

23. The method of claim 22 wherein the act of controlling the electronic control system to operate a model predictive controller comprises:
operating the model predictive controller in a first mode using a first control objective, the first control objective excluding reduction of real power of the distributed energy resources and reduction of demand response of the load/source systems; and
operating the model predictive controller in a second mode using a second control objective including one or both of reduction of real power of the distributed energy resources and includes reduction of demand response of the load/source systems.

24. The method of claim 22 wherein the control objective comprises a function structured to minimize a maximum voltage of the power distribution system.

25. The method of claim 22 comprising:
before the act of controlling the electronic control system to operate the model predictive controller, operating the electronic control system to construct a linearized model of the power distribution system including a plurality of predetermined nodes; and
after the act of transmitting, operating the electronic control system to receive measurement information from the power distribution system associated with the plurality of nodes, update coefficients of the linearized model using the measurement information, and repeat the operating, identifying, transmitting, receiving and updating acts.

26. An electronic control system adapted to operatively communicate with and control an electrical power distribution system including a plurality of power lines electrically coupled with a distribution substation, one or both of one or more switched capacitor banks electrically coupled with the power lines and one or more voltage regulators electrically coupled with the power lines, a plurality of load/source systems electrically coupled with the power lines, the load/source systems including electronic power meters electrically coupled with the power lines and distributed energy resources electrically coupled with the electronic power meters, the distributed energy resources being operatively coupled with respective controllers capable of providing autonomous voltage and VAR control of the distributed energy resources, the electronic control system comprising:

a model predictive controller structured to determine and store in a non-transitory computer readable medium a set of optimized control commands using a control objective and a plurality of constraints, the plurality of constraints including a first constraint defining a linearized relationship between an electrical condition of the power distribution system and predicted control commands, a second constraint establishing one or more limits on the electrical condition, and a third constraint accounting for predicted operation of the distributed energy resources, and a transmitter structured to transmit one or more commands of the set of optimized control commands to control operation of one or both of the voltage regulators and the switched capacitor banks;

wherein the electronic control system does not require a real time power flow model or solution of the power distribution system to predict the electrical state of the power distribution system.

27. The electronic control system of claim 26 wherein the model predictive is controllable to operate in a first mode and a second mode, the first mode using a first control objective that prevents reduction of real power of the distributed energy resources and prevents reduction of demand response of the load/source systems, the a second mode using a second control objective that allows one or both of reduction of real power of the distributed energy resources and reduction of demand response of the load/source systems.

28. The electronic control system of claim 26 wherein the control objective comprises a function structured to minimize deviation of a voltage of the power distribution system from a predetermined voltage.

29. The electronic control system of claim 26 wherein the electronic control system does not have information regarding the power distribution system that is required to run a power flow or solve a circuit model to obtain comprehensive information about the electrical state of the power distribution system.

* * * * *